United States Patent [19]

Naito et al.

[11] Patent Number: 4,741,849
[45] Date of Patent: May 3, 1988

[54] CERAMIC BODY GLASS COMPOSITION FOR BONDING AND FILLING CERAMIC PARTS THEREOF

[75] Inventors: Takashi Naito; Takashi Namekawa; Satoru Ogihara, all of Hitachi, Japan

[73] Assignee: Hitachi, Ltd., Tokyo, Japan

[21] Appl. No.: 2,205

[22] Filed: Jan. 12, 1987

Related U.S. Application Data

[63] Continuation of Ser. No. 794,448, Nov. 4, 1985, abandoned.

[30] Foreign Application Priority Data

Nov. 2, 1984 [JP] Japan ................... 59-230198

[51] Int. Cl.$^4$ .......... C03C 3/21; C03C 14/00; C04B 35/26
[52] U.S. Cl. ................. 252/62.6; 252/62.58; 252/62.59; 501/32; 501/46
[58] Field of Search ............... 252/62.59, 62.6, 62.63; 501/46, 32

[56] References Cited

U.S. PATENT DOCUMENTS

| | | | |
|---|---|---|---|
| 3,278,317 | 10/1966 | Blair et al. | 501/46 |
| 3,393,060 | 7/1968 | Blair et al. | 501/46 |
| 3,520,831 | 7/1970 | Trap | 501/46 |
| 3,650,778 | 3/1972 | Dumesnil et al. | 501/46 |
| 3,983,074 | 9/1976 | Kahn et al. | 501/46 |
| 4,342,943 | 8/1982 | Weaver | 501/46 |

FOREIGN PATENT DOCUMENTS

| | | | |
|---|---|---|---|
| 41609 | of 1972 | Australia . | |
| 37-12810 | 9/1962 | Japan | 501/46 |
| 53-82826 | 7/1978 | Japan . | |
| 58-74539 | 5/1983 | Japan . | |
| 420583 | 11/1974 | U.S.S.R. | 501/46 |

OTHER PUBLICATIONS

Denton, E. P. et al.; "Low Expansion Solder Glasses in the System $ZnO-B_2O_3-V_2O_5$", Journal of the Society of glass Technology 252T–259T.

Primary Examiner—Mark L. Bell
Attorney, Agent, or Firm—Antonelli, Terry & Wands

[57] ABSTRACT

The glass composition is particularly applicable for ferrite constituents used for a highly efficient magnetic head. The composition essentially consists of (a) 55–70 wt % of $V_2O_5$, (b) 18–wt % of $P_2O_5$, (c1) up to 10 wt % of at least one alkaline metal oxide selected from $Na_2O$, $K_2O$, $Rb_2O$, and $Cs_2O$ and (c3) up to 10 wt % of $Tl_2O$. The composition is in a non-crystalline state during reheating and has a softening temperature of 310° C.–400° C. and a thermal expansion coefficient of $70-130 \times 10^{-7}$/°C.

11 Claims, 3 Drawing Sheets

CERAMIC BODY GLASS COMPOSITION FOR BONDING AND FILLING CERAMIC PARTS THEREOF

This is a continuation of application Ser. No. 794,448, filed Nov. 4, 1985, now abandoned.

BACKGROUND OF THE INVENTION

The present invention relates to ceramic body and a glass composition having a low softening temperature suitable for bonding and filling ceramic constituent parts thereof, and particularly suitable for bonding and filling ferrite constituent parts used for highly efficient magnetic heads.

A glass composition used for binding and filling the ceramic constituents, particularly ferrite constituents, is required to have a low softening temperature, which is one of parameters for accessing a working temperature of the glass, so as to minimize adverse thermal influence on the ceramic constituents and further on materials supported on the ceramic constituents, for example an amorphous alloy, during the bonding and filling operation.

The glass is further required to have a little smaller thermal expansion coefficient than that of the ceramic constituents to be bonded and filled so as to minimize generation of cracks in the bonding and filling glass, which reduces the adhesive strength of the glass.

The thermal expansion coefficient of the ferrite constituents used for the magnetic heads is $90-140 \times 10^{-7}/°C$. in the range from room temperature to 300° C.

One of conventional low softening temperature glasses is a glass composition including primarily lead oxide PbO such as $PbO-B_2O_3$ system, $PbO-B_2O_3-ZnO$ system, $PbO-B_2O_3-SiO_2$ system and variations of $PbO-B_2O_3-SiO_2$ system.

Generally, the lower a softening temperature of a glass composition is, the larger a thermal expansion coefficient of the glass is, which is naturally true with the above PbO glass, in that, when an amount of PbO in the glass increases, the softening temperature thereof lowers, however adversely the thermal expansion coefficient increases.

Further the PbO glass corrodes the ferrite constituents at the boundary with the PbO glass so that a magnetic property of the ferrite is reduced.

Still further the PbO glass has a low abrasive resistance which is not desirable as a bonding and filling material for the ferrite constituents of the magnetic heads.

Another conventional low softening temperature glass than the PbO glass is a glass composition including Vanadium pentoxide $V_2O_5$ as the main component which has a lower transition temperature, a lower yield temperature which are also parameters for accessing a working temperature of the glass and further a smaller thermal expansion coefficient than those of the low softening temperature glass including PbO as the main component. However the $V_2O_5$ glass loses the fluidity because of an excess crystallization during reheating of the glass so that a higher working temperature is necessitated for a sufficient bonding and filling. The crystallization of the $V_2O_5$ glass during the reheating is to be limited by decreasing the amount of $V_2O_5$ in the glass, which however raises the transition temperature and the yield temperature of the $V_2O_5$ glass.

Japanese Patent Application Laid Open Print No. 53-82826 (Published on July 21, 1978) discloses one example of a low softening temperature glass including $V_2O_5$, in that, glass of 7.5-14 wt%$Na_2O$-20-50 wt%$ZnO$-0-35 wt%$B_2O_3$-20-60 wt%$P_2O_5$-3-15 wt%$V_2O_5$ system used for bake-painting metal plates with a comparatively low heat resistance such as aluminium plates and thin iron plates and for sealing. However the disclosed glass has a relatively large thermal expansion coefficient of $91-142 \times 10^{-7}/°C$. which is improper for applying to the ferrite constituents and further has a relatively high softening temperature of about 500° C.

Japanese Patent Application Laid Open Print No. 58-74539 (Published on May 6, 1983) discloses another example of a low softening temperature glass including $V_2O_5$, in that, glass of 15-35 wt%$B_2O_3$-7-22 wt%$ZnO$-0-5 wt%$V_2O_5$-19-39 wt%$Bi_2O_3$-19-39 wt%$Tl_2O$ system used for bonding and filling ferrite constituents for magnetic heads. The disclosed glass does not corrodes the ferrite constituents, has a smaller thermal expansion coefficient of $80-90 \times 10^{-7}/°C$. than that of the ferrite, however has a high softening temperature of 560°-600° C. which increases a working temperature of the glass.

SUMMARY OF THE INVENTION

An object of the present invention is to provide a glass composition having both a low softening temperature and a small thermal expansion coefficient suitable for bonding and filling ceramic constituents, particularly ferrite constituents for magnetic heads.

Another object of the present invention is to provide a glass composition having both a low softening temperature and a small thermal expansion coefficient and further having a characteristic of a small change in the softening temperature in accordance with a change in the thermal expansion coefficient suitable for bonding and filling ceramic constituents, particularly ferrite constituents for magnetic heads.

A still further object of the present invention is to provide a glass composition having both a lower softening temperature and a smaller thermal expansion coefficient than those of the low softening temperature glass composition including PbO as the main component, which is suitable for bonding and filling ceramic constituents, particularly ferrite constituent, and which does not corrode the ferrite constituents at the boundary with the glass.

A glass composition of the present invention includes $V_2O_5$ as the main component, but avoids the crystallization and maintains the non-crystalline state during the reheating.

A glass composition of the present invention has a softening temperature of 310°-400° C., a melting temperature of 900°-1100° C., and a working temperature for bonding and filling ceramics, particularly ferrites of 360° C.-500° C. and has a thermal expansion coefficient of $70-130 \times 10^{-7}/°C$.

A glass composition, excluding water, of the present invention essentially consists of:

(a) Vanadium pentoxide $V_2O_5$ in the range of 35-75 wt%, (b) Phosphorous pentoxide $P_2O_5$ in the range of 15-30 wt%, and (c) Metallic oxides with low melting temperatures in the range of 5-40 wt%.

wherein, the metallic oxides with low melting temperatures are at least one selected from, Sodium monoxide $Na_2O$, Potassium monoxide $K_2O$, Rubidium monoxide $Rb_2O$, Cesium monoxide $Cs_2O$ Tellurium dioxide $TeO_2$, and Thallium monoxide $Tl_2O$. The amount of the metal oxides to be added is, (c1) at least one alkaline metal monoxide selected from $Na_2O$, $K_2O$, $Rb_2O$, and $Cs_2O$ not more than 15 wt%, (c2) $TeO_2$, not more than 25 wt%, and (c3) $Tl_2O$ not more than 20 wt%.

A preferable glass composition of the present invention further includes, in addition to the above defined glass compostion, at least one selected from Boron oxide $B_2O_3$, Zinc oxide $ZnO$, Bismuth trioxide $Bi_2O_3$, Silicon dioxide $SiO_2$, Aluminum oxide $Al_2O_3$, Antimony pentoxide $Sb_2O_5$, and Cobalt monoxide $CoO$. The amount of the additive is, (d1) $B_2O_3$ up to 10 wt%, (d2) $ZnO$ up to 16 wt%, (d3) $Bi_2O_3$ up to 12 wt%, (d4) $SiO_2$ up to 3 wt%, (d5) $Al_2O_3$ up to 5 wt%, (d6) $Sb_2O_5$ up to 7 wt%, and (d7) $CoO$ up to 1 wt%.

A further preferable glass composition, excluding water, of the present invention essentially consists of;

(a) Vanadium pentoxide $V_2O_5$ 55–70 wt%

(b) Phosphorous pentoxide $P_2O_5$ 18–25 wt%

(c) at least one alkaline metal monoxide selected from Sodium monoxide $Na_2O$, Potassium monoxide $K_2O$, Rubidium monoxide $Rb_2O$, and Cesium monoxide $Cs_2O$ up to 10 wt%, and (c3) Thallium monoxide $Tl_2O$ up to 10 wt%.

Reasons of the critical amounts defined above on respective components of the glass composition of the present invention are explained below.

$V_2O_5$ lowers a transition temperature and a yield temperature and decreases a thermal expansion coefficient of the glass, however when the amount of $V_2O_5$ exceeds 75 wt%, fluidity of the glass decreases through the reheating thereof. Contrary when the amount of $V_2O_5$ decreases below 35 wt%. The lowering effects for the transition and yield temperatures and the decreasing effect for the thermal expansion coefficient are not obtainable.

$P_2O_5$ improves fluidity of the glass however when the amount of $P_2O_5$ exceeds 30 wt%, the softening temperature of the glass rises and the thermal expansion coefficient thereof increases. On the other hand, when the amount of $P_2O_5$ decreases below 15 wt%, the fluidity of the glass becomes insufficient.

Alkaline metal oxides such as $Na_2O$, $K_2O$, $Rb_2O$, and $Cs_2O$, particularly $Rb_2O$ and $Cs_2O$ contribute to reduce a softening temperature of the glass, however these four components tend to increase a thermal expansion coefficient of a glass, the total amount of the four is preferred to be limited below 15 wt%.

$TeO_2$ lowers a softening temperature and increases fluidity of the glass, however the amount of $TeO_2$ had better be limited below 25 wt% from a view point of the thermal expansion coefficient.

$Tl_2O$ extremely contributes to lower a softening temperature of the glass, however $Tl_2O$ increases the thermal expansion coefficient of the glass beyond a limit, when the amount exceeds 20 wt%.

$B_2O_3$ increases a chemical durability of the glass, however when the amount exceeds 10 wt%, the softening temperature of the glass rises beyond a limit.

$ZnO$ increases a chemical durability and decreases, a thermal expansion coefficient of the glass, however when the amount exceeds 16 wt%, the softening temperature of the glass extremely rises.

$Bi_2O_3$ is effective to increase a chemical resistance of the glass, especially to alkaline chemicals, however when the amount exceeds 12 wt%, the glass tends to devitrify.

$SiO_2$ improves a chemical durability, however when the amount exceeds 3 wt%, the softening temperature of the glass rises beyond a limit.

$Al_2O_3$ prevents devitrification of the glass, however when the amount exceeds 5 wt%, the softening temperature of the glass rises beyond a limit.

$Sb_2O_5$ also prevents devitrification and decreases a thermal expansion coefficient of the glass, however when the amount exceeds 7 wt%, the softening temperature of the glass rises beyond a limit.

$CoO$ improves wettability of the glass to ferrite, however when the amount exceeds 1 wt%, the softening temperature of the glass rises beyond a limit.

Any materials which produce above defined oxides and any mixtures thereof by firing are used as a raw material for the glass composition of the present invention.

A glass production method of the present invention is explained hereinafter. Combined and mixed raw materials of the glass components were put into an alumina or a platinum crucible, were melted and mixed at 900°–1100° C. for 2 hours in an electric furnace. The glass composition of the present invention was produced by pouring into a graphite jig kept at 250°–300° C. for cooling and then by aircooling.

BRIEF DESCRIPTION OF THE DRAWINGS

FIG. 1 shows relationship between thermal expansion coefficient and softening temperature (point) of the glass compositions of the present invention and the conventional glass compositions.

FIG. 2 shows relationship between thermal expansion coefficient and transition temperature (point) of the glass composition of the present invention and of the conventional glass compositions.

FIG. 3 shows relationship between thermal expansion coefficient and yield temperature (point) of the glass composition of the present invention and the conventional glass composition.

EXAMPLES OF THE INVENTION

Figure 1:
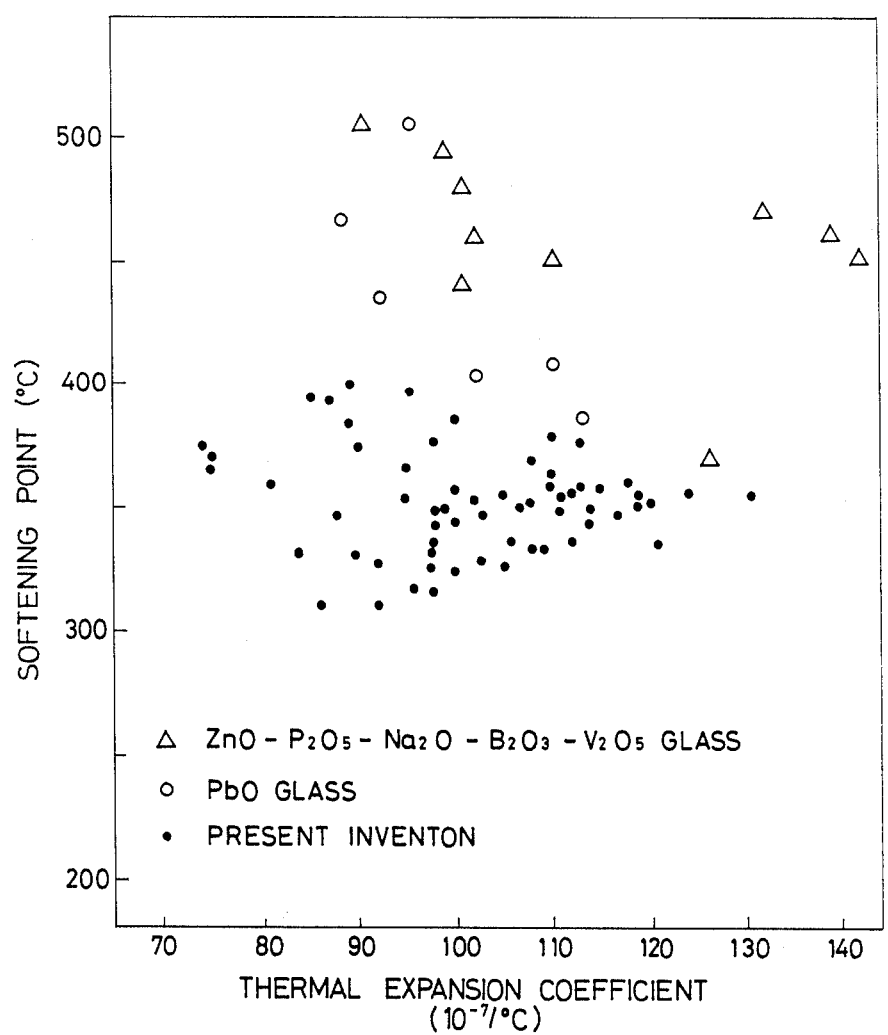
FIGS. 1–3 are plots of data mostly indicated on Tables 7–10.

The present invention is more specifically explained referring to the following examples.

Tables 1–5 show examples of the glass composition of the present invention.

Table 6 shows examples of a comparative glass composition.

Tables 7–10 show physical properties of the glass compositions indicated on Tables 1–6.

Measuring methods of the physical properties of the respective glass compositions are as follows;

(1) Measurement of transition, yield and softening temperatures (point):

The respective temperatures were measured on powder glasses by a differential thermal analyzer with a heating rate of 10° C./min.

(2) Measurement of thermal expansion coefficient:

The thermal expansion coefficient was measured on test piece glasses of column shape of 5φ×20 mm by a thermal dilatometer with a heating rate of 10° C./min.

TABLE 1

| Example | $V_2O_5$ | $P_2O_5$ | $Na_2O$ | $K_2O$ | $Rb_2O$ | $Cs_2O$ | $TeO_2$ | $Tl_2O$ | $B_2O_3$ | ZnO | $Bi_2O_3$ | $SiO_2$ | $Al_2O_3$ | $Sb_2O_5$ | CoO |
|---|---|---|---|---|---|---|---|---|---|---|---|---|---|---|---|
| 1 | 57.0 | 26.0 | — | — | — | — | — | 17.0 | — | — | — | — | — | — | — |
| 2 | 57.0 | 25.0 | — | — | — | — | 18.0 | — | — | — | — | — | — | — | — |
| 3 | 57.0 | 21.0 | — | — | — | 7.0 | — | 15.0 | — | — | — | — | — | — | — |
| 4 | 57.0 | 20.0 | — | — | — | 5.0 | 6.0 | 12.0 | — | — | — | — | — | — | — |
| 5 | 50.0 | 20.0 | — | 8.0 | — | — | 12.0 | 10.0 | — | — | — | — | — | — | — |
| 6 | 55.0 | 20.0 | — | 7.0 | — | — | 10.0 | 8.0 | — | — | — | — | — | — | — |
| 7 | 60.0 | 20.0 | — | 6.0 | — | — | 8.0 | 6.0 | — | — | — | — | — | — | — |
| 8 | 60.0 | 20.0 | 5.0 | — | — | — | 9.0 | 6.0 | — | — | — | — | — | — | — |
| 9 | 55.0 | 20.0 | — | — | 8.0 | — | 9.0 | 8.0 | — | — | — | — | — | — | — |
| 10 | 68.0 | 21.0 | 4.0 | 4.0 | — | — | 3.0 | — | — | — | — | — | — | — | — |
| 11 | 65.0 | 20.0 | — | 5.0 | — | 5.0 | 5.0 | — | — | — | — | — | — | — | — |
| 12 | 70.0 | 25.0 | — | — | — | 5.0 | — | — | — | — | — | — | — | — | — |
| 13 | 54.0 | 20.0 | — | 5.0 | — | — | 9.0 | 8.0 | 3.0 | 1.0 | — | — | — | — | — |

(Unit: wt %)

TABLE 2

| Example | $V_2O_5$ | $P_2O_5$ | $Na_2O$ | $K_2O$ | $Rb_2O$ | $Cs_2O$ | $TeO_2$ | $Tl_2O$ | $B_2O_3$ | ZnO | $Bi_2O_3$ | $SiO_2$ | $Al_2O_3$ | $Sb_2O_5$ | CoO |
|---|---|---|---|---|---|---|---|---|---|---|---|---|---|---|---|
| 14 | 60.0 | 20.0 | — | 5.0 | — | — | 6.0 | 6.0 | 3.0 | — | — | — | — | — | — |
| 15 | 65.0 | 20.0 | — | 4.0 | — | — | 4.0 | 4.0 | 3.0 | — | — | — | — | — | — |
| 16 | 65.0 | 20.0 | — | 6.0 | — | — | — | 6.0 | 3.0 | — | — | — | — | — | — |
| 17 | 65.0 | 20.0 | — | 6.0 | — | — | 6.0 | — | 3.0 | — | — | — | — | — | — |
| 18 | 70.0 | 20.0 | — | 2.0 | — | — | 1.0 | 4.0 | 3.0 | — | — | — | — | — | — |
| 19 | 70.0 | 20.0 | — | 2.0 | — | — | 4.0 | 1.0 | 3.0 | — | — | — | — | — | — |
| 20 | 70.0 | 20.0 | — | 2.0 | — | — | 2.0 | 2.0 | 3.0 | 1.0 | — | — | — | — | — |
| 21 | 35.0 | 18.0 | — | 7.0 | — | — | 11.0 | 9.0 | 5.0 | 12.0 | — | 1.0 | 2.0 | — | — |
| 22 | 50.0 | 21.0 | — | — | — | 10.0 | — | — | 9.0 | 10.0 | — | — | — | — | — |
| 23 | 45.0 | 16.0 | — | 10.0 | — | 5.0 | — | — | 8.0 | 16.0 | — | — | — | — | — |
| 24 | 32.0 | 16.0 | — | 9.0 | — | — | 12.0 | 8.0 | 5.0 | 12.0 | — | 1.0 | 5.0 | — | — |
| 25 | 37.0 | 22.0 | — | 5.0 | — | — | 8.0 | 8.0 | 6.0 | 14.0 | — | — | — | — | — |
| 26 | 51.0 | 19.0 | — | 6.0 | — | — | 12.0 | 10.0 | — | — | — | 1.0 | 1.0 | — | — |

(Unit: wt %)

TABLE 3

| Example | $V_2O_5$ | $P_2O_5$ | $Na_2O$ | $K_2O$ | $Rb_2O$ | $Cs_2O$ | $TeO_2$ | $Tl_2O$ | $B_2O_3$ | ZnO | $Bi_2O_3$ | $SiO_2$ | $Al_2O_3$ | $Sb_2O_5$ | CoO |
|---|---|---|---|---|---|---|---|---|---|---|---|---|---|---|---|
| 27 | 35.0 | 17.5 | — | 6.5 | — | — | 11.5 | 9.5 | 4.5 | 12.5 | — | 1.0 | 1.0 | — | — |
| 28 | 52.0 | 21.5 | — | 5.5 | — | — | 10.0 | 9.0 | — | — | — | 2.0 | 1.0 | — | — |
| 29 | 53.5 | 20.0 | — | 5.5 | — | — | 9.0 | 9.0 | — | 1.0 | — | 1.0 | 1.0 | — | — |
| 30 | 52.5 | 20.0 | — | 5.5 | — | — | 9.0 | 9.0 | — | 2.0 | — | 1.0 | 1.0 | — | — |
| 31 | 50.0 | 20.0 | — | 5.0 | — | — | 9.0 | 9.0 | — | 5.0 | — | 1.0 | 1.0 | — | — |
| 32 | 50.0 | 19.0 | — | 5.0 | — | — | 8.5 | 8.5 | — | 7.0 | — | 1.0 | 1.0 | — | — |
| 33 | 53.0 | 19.0 | — | 6.0 | — | — | 9.0 | 6.0 | 3.0 | 1.0 | — | 1.0 | 1.0 | — | — |
| 34 | 63.0 | 20.0 | — | 4.0 | — | — | 5.0 | 3.0 | 3.0 | 1.0 | — | 0.5 | 0.5 | — | — |
| 35 | 58.0 | 20.0 | — | 5.0 | — | — | 8.0 | 5.0 | 3.0 | 1.0 | — | — | — | — | — |
| 36 | 63.0 | 21.0 | — | 4.0 | — | — | 5.0 | 3.0 | 3.0 | 1.0 | — | — | — | — | — |
| 37 | 52.5 | 19.0 | — | 5.5 | — | — | 10.0 | 7.0 | 3.0 | 1.0 | — | 1.0 | 1.0 | — | — |
| 38 | 51.0 | 19.0 | — | 5.5 | — | — | 10.0 | 7.0 | 3.0 | 1.0 | 1.5 | 1.0 | 1.0 | — | — |
| 39 | 49.0 | 18.0 | — | 5.0 | — | — | 10.0 | 7.0 | 3.0 | 1.0 | 5.0 | 1.0 | 1.0 | — | — |

(Unit: wt %)

TABLE 4

| Example | $V_2O_5$ | $P_2O_5$ | $Na_2O$ | $K_2O$ | $Rb_2O$ | $Cs_2O$ | $TeO_2$ | $Tl_2O$ | $B_2O_3$ | ZnO | $Bi_2O_3$ | $SiO_2$ | $Al_2O_3$ | $Sb_2O_5$ | CoO |
|---|---|---|---|---|---|---|---|---|---|---|---|---|---|---|---|
| 40 | 55.0 | 19.5 | — | 5.5 | — | — | 8.0 | 5.0 | 3.0 | 1.0 | 1.0 | 1.0 | 1.0 | — | — |
| 41 | 42.0 | 19.5 | — | 5.5 | — | — | 10.0 | 7.0 | 3.0 | 1.0 | 10.0 | 1.0 | 1.0 | — | — |
| 42 | 58.0 | 20.0 | — | 5.0 | — | — | 7.0 | 6.0 | 3.0 | — | 1.0 | — | — | — | — |
| 43 | 57.0 | 20.0 | — | — | — | 5.0 | 6.0 | 6.0 | 3.0 | 1.0 | — | 0.9 | 1.0 | — | 0.1 |
| 44 | 52.0 | 19.0 | — | 5.0 | — | 1.0 | 9.0 | 8.0 | 3.0 | 1.0 | — | 0.8 | 1.0 | — | 0.2 |
| 45 | 58.0 | 20.0 | — | 5.0 | — | — | 6.0 | 6.0 | 3.0 | — | — | 0.9 | 1.0 | — | 0.1 |
| 46 | 38.5 | 15.0 | 4.0 | 4.0 | — | — | 10.0 | — | 10.0 | 16.0 | — | 1.0 | 1.0 | — | 0.5 |
| 47 | 57.0 | 20.0 | — | 1.0 | — | 5.0 | 5.0 | 6.0 | 3.0 | 1.0 | — | 1.0 | 0.9 | — | 0.1 |
| 48 | 60.0 | 20.0 | — | — | — | 4.9 | 10.0 | 5.0 | — | — | — | — | — | — | 0.1 |
| 49 | 60.0 | 20.0 | — | — | — | 4.9 | 8.0 | 7.0 | — | — | — | — | — | — | 0.1 |
| 50 | 55.0 | 20.0 | — | — | — | 4.9 | 8.0 | 7.0 | — | — | — | — | — | 5.0 | 0.1 |
| 51 | 58.0 | 20.0 | — | — | — | 4.9 | 8.0 | 7.0 | — | — | — | 1.0 | 1.0 | — | 0.1 |
| 52 | 49.0 | 20.0 | — | — | — | 5.0 | 8.0 | 7.0 | 3.0 | — | — | — | — | 7.0 | 1.0 |

TABLE 4-continued

| Example | V$_2$O$_5$ | P$_2$O$_5$ | Na$_2$O | K$_2$O | Rb$_2$O | Cs$_2$O | TeO$_2$ | Tl$_2$O | B$_2$O$_3$ | ZnO | Bi$_2$O$_3$ | SiO$_2$ | Al$_2$O$_3$ | Sb$_2$O$_5$ | CoO |
|---|---|---|---|---|---|---|---|---|---|---|---|---|---|---|---|

(Unit: wt %)

TABLE 5

| Example | V$_2$O$_5$ | P$_2$O$_5$ | Na$_2$O | K$_2$O | Rb$_2$O | Cs$_2$O | TeO$_2$ | Tl$_2$O | B$_2$O$_3$ | ZnO | Bi$_2$O$_3$ | SiO$_2$ | Al$_2$O$_3$ | Sb$_2$O$_5$ | CoO |
|---|---|---|---|---|---|---|---|---|---|---|---|---|---|---|---|
| 53 | 70 | 20 | 3 | — | — | — | — | 7 | — | — | — | — | — | — | — |
| 54 | 60 | 25 | 8 | — | — | — | — | 7 | — | — | — | — | — | — | — |
| 55 | 70 | 20 | — | 3 | — | — | — | 7 | — | — | — | — | — | — | — |
| 56 | 60 | 25 | — | 8 | — | — | — | 7 | — | — | — | — | — | — | — |
| 57 | 70 | 20 | — | — | 3 | — | — | 7 | — | — | — | — | — | — | — |
| 58 | 60 | 25 | — | — | 10 | — | — | 5 | — | — | — | — | — | — | — |
| 59 | 75 | 18 | — | — | — | 5 | — | 2 | — | — | — | — | — | — | — |
| 60 | 70 | 20 | — | — | — | — | — | 10 | — | — | — | — | — | — | — |
| 61 | 70 | 20 | — | — | — | 10 | — | — | — | — | — | — | — | — | — |
| 62 | 70 | 20 | — | — | — | 5 | — | 5 | — | — | — | — | — | — | — |
| 63 | 65 | 20 | — | — | — | 5 | — | 10 | — | — | — | — | — | — | — |
| 64 | 60 | 20 | — | — | — | 7 | — | 13 | — | — | — | — | — | — | — |
| 65 | 55 | 20 | — | — | — | 9 | — | 16 | — | — | — | — | — | — | — |

(Unit: wt %)

TABLE 6

| Example | PbO | B$_2$O$_3$ | SiO$_2$ | Al$_2$O$_3$ | ZnO |
|---|---|---|---|---|---|
| 1 | 72.0 | 5.0 | 12.0 | 5.0 | 6.0 |
| 2 | 78.0 | 13.0 | 2.0 | — | 7.0 |
| 3 | 84.0 | 11.0 | 4.0 | 1.0 | — |
| 4 | 82.0 | 12.0 | 3.0 | 3.0 | — |
| 5 | 66.0 | 9.0 | 20.0 | 1.0 | 4.0 |
| 6 | 85.0 | 13.0 | 1.0 | 1.0 | — |

(Unit: wt %)

TABLE 7

| Example | Transition point (°C.) | Yield point (°C.) | Softening point (°C.) | Thermal expansion coefficient ($10^{-7}$/°C.) |
|---|---|---|---|---|
| 1 | 265 | 281 | 325 | 100 |
| 2 | 270 | 296 | 350 | 98 |
| 3 | 267 | 290 | 334 | 109 |
| 4 | 266 | 288 | 344 | 96 |
| 5 | 277 | 298 | 355 | 130 |
| 6 | 278 | 305 | 352 | 119 |
| 7 | 276 | 292 | 350 | 114 |
| 8 | 296 | 317 | 375 | 90 |
| 9 | 295 | 315 | 368 | 108 |
| 10 | 267 | 292 | 350 | 107 |
| 11 | 265 | 288 | 346 | 103 |
| 12 | 278 | 310 | 376 | 74 |
| 13 | 290 | 318 | 377 | 113 |
| 14 | 286 | 307 | 365 | 95 |
| 15 | 267 | 289 | 345 | 100 |
| 16 | 268 | 288 | 334 | 108 |
| 17 | 274 | 298 | 353 | 102 |
| 18 | 278 | 303 | 360 | 81 |
| 19 | 277 | 308 | 370 | 75 |
| 20 | 274 | 305 | 366 | 75 |

TABLE 8

| Example | Transition point (°C.) | Yield point (°C.) | Softening point (°C.) | Thermal expansion coefficient ($10^{-7}$/°C.) |
|---|---|---|---|---|
| 21 | 274 | 322 | 397 | 95 |
| 22 | 256 | 273 | 362 | 110 |
| 23 | 245 | 283 | 355 | 112 |
| 24 | 274 | 326 | 385 | 100 |
| 25 | 296 | 332 | 400 | 89 |
| 26 | 280 | 306 | 358 | 113 |
| 27 | 277 | 314 | 376 | 98 |
| 28 | 262 | 305 | 360 | 118 |
| 29 | 280 | 306 | 357 | 124 |
| 30 | 280 | 304 | 358 | 113 |
| 31 | 274 | 290 | 352 | 120 |
| 32 | 270 | 290 | 347 | 117 |
| 33 | 274 | 300 | 358 | 110 |
| 34 | 263 | 280 | 337 | 98 |
| 35 | 270 | 295 | 352 | 108 |
| 36 | 272 | 309 | 349 | 98 |
| 37 | 268 | 292 | 354 | 111 |
| 38 | 266 | 288 | 344 | 114 |
| 39 | 274 | 304 | 356 | 119 |
| 40 | 278 | 295 | 350 | 111 |

TABLE 9

| Example | Transition point (°C.) | Yield point (°C.) | Softening point (°C.) | Thermal expansion coefficient ($10^{-7}$/°C.) |
|---|---|---|---|---|
| 41 | 296 | 318 | 378 | 110 |
| 42 | 272 | 290 | 347 | 95 |
| 43 | 261 | 285 | 348 | 88 |
| 44 | 265 | 287 | 355 | 119 |
| 45 | 271 | 292 | 358 | 115 |
| 46 | 307 | 346 | 393 | 87 |
| 47 | 274 | 294 | 353 | 95 |
| 48 | 270 | 294 | 354 | 105 |
| 49 | 282 | 297 | 357 | 100 |
| 50 | 308 | 326 | 384 | 89 |
| 51 | 270 | 282 | 339 | 103 |
| 52 | 305 | 330 | 395 | 85 |
| 53 | 250 | 273 | 326 | 105 |
| 54 | 258 | 273 | 340 | 112 |
| 55 | 260 | 274 | 320 | 96 |
| 56 | 258 | 270 | 318 | 98 |
| 57 | 257 | 269 | 316 | 92 |
| 58 | 263 | 283 | 336 | 98 |
| 59 | 250 | 267 | 310 | 87 |
| 60 | 255 | 274 | 330 | 84 |

TABLE

| | Transition point (°C.) | Yield point (°C.) | Softening point (°C.) | Thermal expansion coefficient ($10^{-7}$/°C.) |
|---|---|---|---|---|
| 61 | 260 | 275 | 328 | 92 |
| 62 | 258 | 274 | 325 | 90 |
| 63 | 258 | 274 | 323 | 98 |
| 64 | 272 | 292 | 341 | 106 |
| 65 | 272 | 289 | 340 | 121 |

TABLE -continued

|  | Transition point (°C.) | Yield point (°C.) | Softening point (°C.) | Thermal expansion coefficient ($10^{-7}$/°C.) |
|---|---|---|---|---|
| Comparative Example | 372 | 395 | 467 | 88 |
| 2 | 350 | 373 | 435 | 92 |
| 3 | 302 | 333 | 409 | 110 |
| 4 | 327 | 347 | 405 | 102 |
| 5 | 395 | 419 | 505 | 95 |
| 6 | 313 | 332 | 386 | 113 |

Tables 7-10 and FIG. 1 show that the softening temperature of the glass composition of the present invention is 310°-400° C., which is much lower than those of the conventional glass compositions such as $ZnO$-$P_2O_5$-$Na_2O$-$B_2O_3$-$V_2O_5$ system and PbO glass, and that although the thermal expansion coefficient of the glass composition of the present invention extends 70-130×$10^{-7}$/°C., a variation of the softening temperatures of the present glass composition in dependence with the thermal expansion coefficient is much smaller than those of the conventional glass compositions, in that, with the conventional glass composition, the lower the thermal expansion coefficient is, the higher the softening temperature is, however, with the glass composition of the present invention, the relationship between the thermal expansion coefficient and the softening temperature is substantially flat as seen from FIG. 1, thus with the glass composition of the present invention, when a specific amount of glass components are selected to reduce the thermal expansion coefficient, the softening temperature of the glass composition does not substantially increase.

Figure 2:
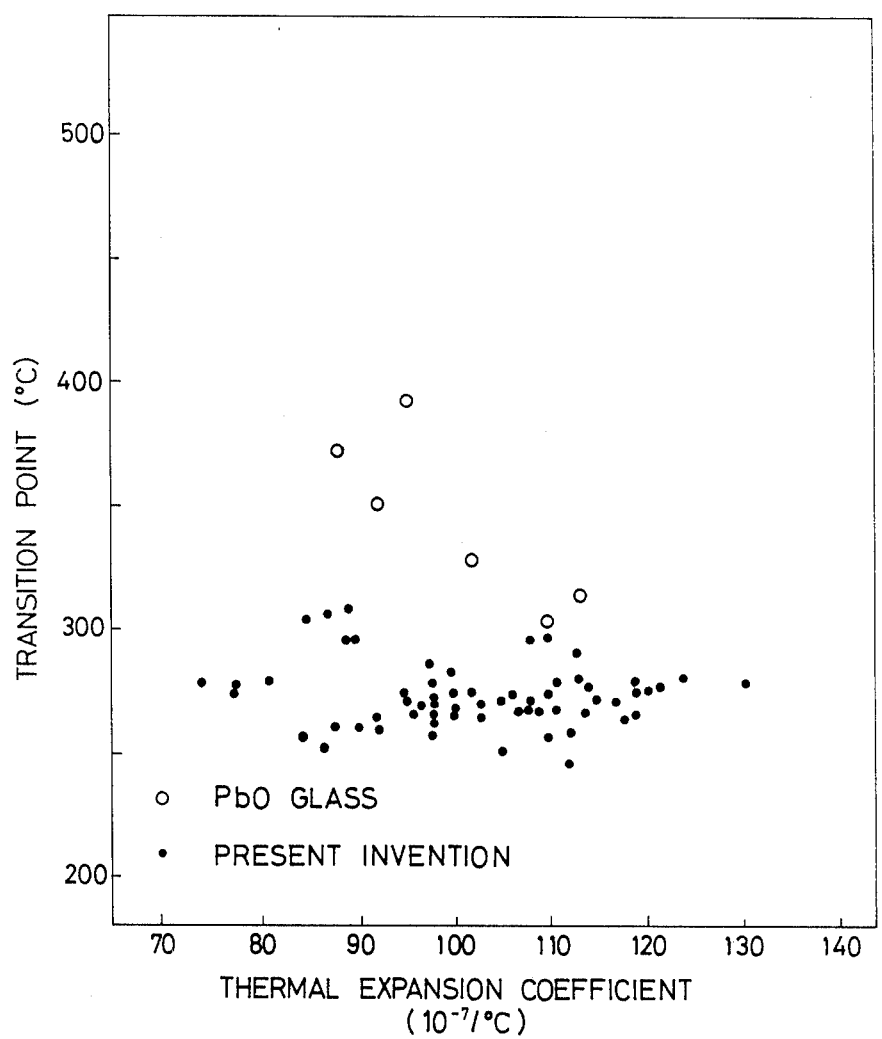

Tables 7-10 and FIG. 2 show that the transition temperature of the glass composition of the present invention is 240°-310° C. which is much lower than those of conventional PbO glass composition, and that although the thermal expansion coefficient of the glass conposition of the present invention extends 70-130×$10^{-7}$/°C., a variation of the transition temperatures of the present glass composition in dependence with the thermal expansion coefficients is much smaller than those of the conventional PbO glass composition as well as the softening temperature of the present glass composition as seen from FIG. 2.

Figure 3:
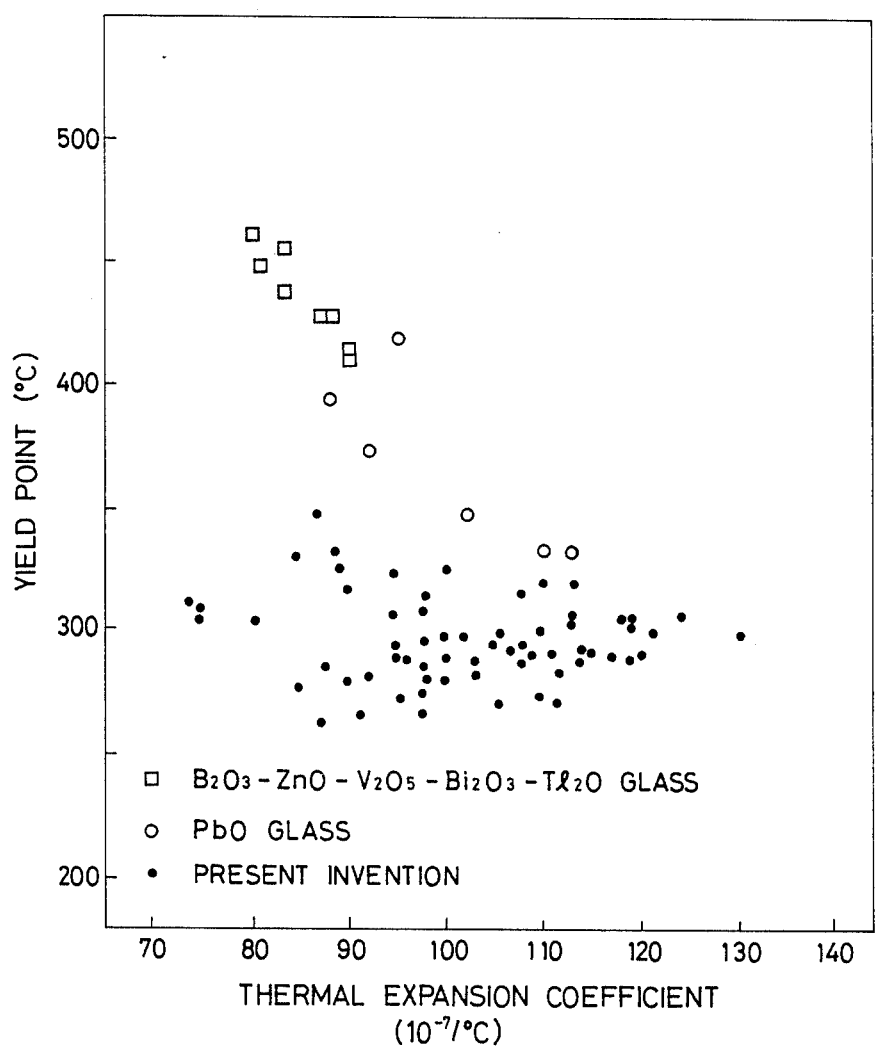

Table 7-10 and FIG. 3 show that the yield temperature of the glass composition of the present invention is 260°-350° C. which is much lower than those of the conventional glass compositions such as $B_2O_3$-$ZnO$-$V_2O_5$-$Bi_2O_3$-$Tl_2O$ system and PbO glass, and that although the thermal expansion coefficient of the glass composition of the present invention extends 70-130×$10^{-7}$/°C. a variation of the yield temperatures of the present glass composition in dependence with the thermal expansion coefficients is much smaller than those of the conventional glass compositions as well as the softening temperature of the present glass composition as seen from FIG. 3.

Accordingly a working temperature of the present glass composition is reduced to 360°-500° C. and further any desirable thermal expansion coefficients which are a little smaller than that of a specific ceramic, particularly ferrite used is selectable by adjusting the amounts of glass components defined in the appended claims, while retaining the softening temperature of the glass composition.

We claim:
1. A glass composition for bonding and filling ceramic constituents which consist essentially of:
   (a) 55-70 wt% of vanadium pentoxide;
   (b) 17-25 wt% of phosphorous pentoxide;
   (c1) 1.0-10 wt% of at least one alkaline metal monoxide selected from the group consisting of $Na_2O$, $K_2O$, $Rb_2O$, and $Cs_2O$; and
   (c2) 1.0-10 wt% of $Tl_2O$, with the proviso that the amount of (c1)+(c2) is not less than 5 wt%.
2. A glass composition according to claim 1 further including at least one selected from Boron oxide $B_2O_3$, Zinc Oxide ZnO Bismuth trioxide $Bi_2O_3$, Silicon dioxide $SiO_2$, Aluminum oxide $Al_2O_3$, Antimony pentoxide $Sb_2O_5$ and Cobalt monoxide CoO,
   (d1) the amount of $B_2O_3$ is up to 10 wt%,
   (d2) the amount of ZnO is up to 16 wt%,
   (d3) the amount of $Bi_2O_3$ is up to 12 wt%,
   (d4) the amount of $SiO_2$ is up to 3 wt%,
   (d5) the amount of $Al_2O_3$ is up to 5 wt%,
   (d6) the amount of $Sb_2O_5$ is up to 7 wt%, and
   (d7) the amount of CoO is up to 1 wt%.
3. A glass composition according to claim 1, wherein the glass composition is in a substautially non-crystalline state during reheating thereof.
4. A glass composition according to claim 1, wherein the glass composition has a softening temperature of 310°-400° C. and a thermal expansion coefficient of 70-130×$10^{-7}$/°C.
5. A glass composition according to claim 1, wherein the glass composition has a small variation in softening temperatures regardless of variation in thermal expansion coefficients therof.
6. A ceramic body including ceramic constituents and a glass composition for bonding and filling said ceramic constituents, wherein said glass composition consists essentially of:
   (a) 55-70 wt% of vanadium pentoxide;
   (b) 18-25 wt% of phosphorous pentoxide;
   (c1) 1.0-10 wt% at least one alkaline metal monoxide selected from the group consisting of $Na_2O$, $K_2O$, $Rb_2O$, and $Cs_2O$; and
   (c2) 1.0-10 wt% of $Tl_2O$, with the proviso that the amount of (c1)+(c2) is not less than 5 wt%.
7. A ceramic body according to claim 6, wherein said glass composition further including at least one member selected from the group consisting of boron oxide ($B_2O_3$), zinc oxide (ZnO), bismuth trioxide ($Bi_2O_3$), silicon dioxide ($SiO_2$), aluminum oxide ($Al_2O_3$), antimony pentoxide ($Sb_2O_5$), and cobalt monoxide (CoO),
   (d1) the amount of $B_2O_3$ is up to 10 wt%,
   (d2) the amount of ZnO is up to 16 wt%,
   (d3) the amount of $Bi_2O_3$ is up to 12 wt%,
   (d4) the amount of $SiO_2$ is up to 3 wt%,
   (d5) the amount of $Al_2O_3$ is up to 5 wt%,
   (d6) the amount of $Sb_2O_5$ is up to 7 wt%, and
   (d7) the amount of CoO is up to 1 wt%.
8. A ceramic body according to claim 6, wherein said glass composition is in a substantially non-crystalline state during reheating thereof.
9. A ceramic body according to claim 6, wherein said glass composition has a softening temperature of 310°-400° C. and a thermal expansion coefficient of 70-130×$10^{-7}$/°C.
10. A ceramic body according to claim 6, wherein said glass composition has small variation in softening temperatures regardless of variation in thermal expansion coefficients thereof.

11. A ferrite body including ferrite constituents and glass composition for bonding and filling said ferrite constituents, wherein said glass composition consists essentially of:
(a) 55-70 wt% of vanadium pentoxide;
(b) 18-25 wt% of phosphorous pentoxide;
(c1) 1.0-10 wt% of at least one alkaline metal monoxide selected from the group consisting of $Na_2O$, $K_2O$, $Rb_2O$, and $Cs_2O$; and
(c2) 1.0-10 wt% of $Tl_2O$, with the proviso that the amount of (c1)+(c2) is not less than 5 wt%.

* * * * *